US011594037B1

(12) United States Patent
Grossman et al.

(10) Patent No.: US 11,594,037 B1
(45) Date of Patent: Feb. 28, 2023

(54) VEHICLE SENSOR CALIBRATION AND VERIFICATION

(71) Applicant: Waymo LLC, Mountain View, CA (US)

(72) Inventors: William Grossman, East Palo Alto, CA (US); Peter Strohm, Stanford, CA (US)

(73) Assignee: Waymo LLC, Mountain View, CA (US)

( * ) Notice: Subject to any disclaimer, the term of this patent is extended or adjusted under 35 U.S.C. 154(b) by 285 days.

(21) Appl. No.: 16/914,803

(22) Filed: Jun. 29, 2020

(51) Int. Cl.
*G06V 20/56* (2022.01)
*B60W 60/00* (2020.01)
*H04W 4/40* (2018.01)
*G06T 7/80* (2017.01)

(52) U.S. Cl.
CPC ........... *G06V 20/56* (2022.01); *B60W 60/001* (2020.02); *H04W 4/40* (2018.02); *B60W 2420/42* (2013.01); *B60W 2420/52* (2013.01)

(58) Field of Classification Search
CPC .......... G06V 20/56; G01S 5/02; G01S 7/497; G01S 7/4815; G01S 17/42; G01S 7/4026; H04L 67/12; G01L 19/00; G05G 23/00; G06T 7/80; G06T 7/97; B60W 60/001
See application file for complete search history.

(56) References Cited

U.S. PATENT DOCUMENTS 9,201,133 B2 * 12/2015 Huang ................ G01S 5/02
9,952,317 B2    4/2018 Valois et al.
2019/0049342 A1 * 2/2019 Anderson .......... B60W 60/001
2019/0056484 A1 * 2/2019 Bradley ................ G01S 7/4815
2019/0100420 A1 * 4/2019 Perlstein ................ G05G 23/00
2019/0122386 A1 * 4/2019 Wheeler ................ G01S 17/42
2019/0172225 A1    6/2019 Park et al.
2019/0204427 A1 * 7/2019 Abari ....................... G01S 7/497
2019/0360886 A1 * 11/2019 Dormody ................ G01L 19/00
2020/0272142 A1 * 8/2020 Beauvillain ............. H04L 67/12
2021/0166428 A1 * 6/2021 Kehl .......................... G06T 7/97
2021/0239793 A1 * 8/2021 Yu ......................... G01S 7/4026

FOREIGN PATENT DOCUMENTS

CN      109118547 A  *  1/2019  ............... G06T 7/80
CN      109118547 A      1/2019

* cited by examiner

*Primary Examiner* — Yuri Kan
(74) *Attorney, Agent, or Firm* — McDonnell Boehnen Hulbert & Berghoff LLP

(57) ABSTRACT

Systems and methods for automated vehicle sensor calibration and verification are provided. One example method involves monitoring a vehicle using one or more external sensors of a vehicle calibration facility. The sensor data may be indicative of a relative position of the vehicle in the vehicle calibration facility. The method also involves causing the vehicle to navigate in an autonomous driving mode, based on the sensor data, from a current position of the vehicle to a first calibration position in the vehicle calibration facility. The method also involves causing a first sensor of the vehicle to perform a first calibration measurement while the vehicle is at the first calibration position. The method also involves calibrating the first sensor based on at least the first calibration measurement.

20 Claims, 10 Drawing Sheets

VEHICLE SENSOR CALIBRATION AND VERIFICATION

BACKGROUND

A vehicle may be equipped with a variety of sensors to facilitate safe operation of the vehicle in a surrounding environment. Example sensors may include position sensors (e.g., Global Positioning System, etc.), inertial sensors (e.g., gyroscopes, accelerometers, etc.), scanning sensors (e.g., LIDARs, RADARs, Cameras, etc.), among other types of sensors.

SUMMARY

In a first example, a method is provided that involves monitoring a vehicle using one or more external sensors at a vehicle calibration facility. Sensor data collected by the one or more external sensors is indicative of a relative position of the vehicle in the vehicle calibration facility. The method also involves causing the vehicle to navigate in an autonomous driving mode, based on at least the sensor data collected by the one or more external sensors, from a current position of the vehicle to a first calibration position in the vehicle calibration facility. The method also involves causing a first sensor of the vehicle to perform a first calibration measurement while the vehicle is at the first calibration position. The method also involves calibrating the first sensor based on at least the first calibration measurement.

In a second example, a system is provided. The system includes a plurality of external sensors physically arranged at different respective locations in a vehicle calibration facility. The system also includes a wireless communication interface, one or more processors, and data storage. The data storage stores instructions that, when executed by the one or more processors, cause the system to perform operations. The operations comprise monitoring a vehicle using the plurality of external sensors. Sensor data collected by the plurality of external sensors is indicative of a relative position of the vehicle in the vehicle calibration facility. The operations also comprise causing the vehicle to navigate in an autonomous driving mode, based on at least the sensor data collected by the plurality of external sensors, from a current position of the vehicle to a first calibration position in the vehicle calibration facility. The operations also comprise causing the vehicle to obtain, from a first sensor mounted on the vehicle, a first calibration measurement while the vehicle is at the first calibration position. The operations also comprise calibrating the first sensor based on at least the first calibration measurement.

In a third example, a method is provided that involves receiving, by a vehicle, sensor data transmitted by an external computing system. The sensor data is collected using a plurality of external sensors that are physically arranged at different respective locations in a vehicle calibration facility. The sensor data is indicative of a relative position of the vehicle in the vehicle calibration facility. The method also involves operating, based on at least the sensor data, in an autonomous driving mode to navigate the vehicle from a current position of the vehicle to a first calibration position in the vehicle calibration facility. The method also involves obtaining, from a first sensor mounted to the vehicle, a first calibration measurement while the vehicle is at the first calibration position. The method also involves calibrating the first sensor based on at least the first calibration measurement.

In a fourth example, a system is provided that includes means for monitoring a vehicle using one or more external sensors at a vehicle calibration facility. Sensor data collected by the one or more external sensors is indicative of a relative position of the vehicle in the vehicle calibration facility. The system also includes means for causing the vehicle to navigate in an autonomous driving mode, based on at least the sensor data collected by the one or more external sensors, from a current position of the vehicle to a first calibration position in the vehicle calibration facility. The system also includes means for causing a first sensor of the vehicle to perform a first calibration measurement while the vehicle is at the first calibration position. The system also includes means for calibrating the first sensor based on at least the first calibration measurement.

In a fifth example, a system is provided that includes means for receiving, by a vehicle, sensor data transmitted by an external computing system. The sensor data is collected using a plurality of external sensors that are physically arranged at different respective locations in a vehicle calibration facility. The sensor data is indicative of a relative position of the vehicle in the vehicle calibration facility. The system also includes means for operating, based on at least the sensor data, in an autonomous driving mode to navigate the vehicle from a current position of the vehicle to a first calibration position in the vehicle calibration facility. The system also includes means for obtaining, from a first sensor mounted to the vehicle, a first calibration measurement while the vehicle is at the first calibration position. The system also includes means for calibrating the first sensor based on at least the first calibration measurement.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
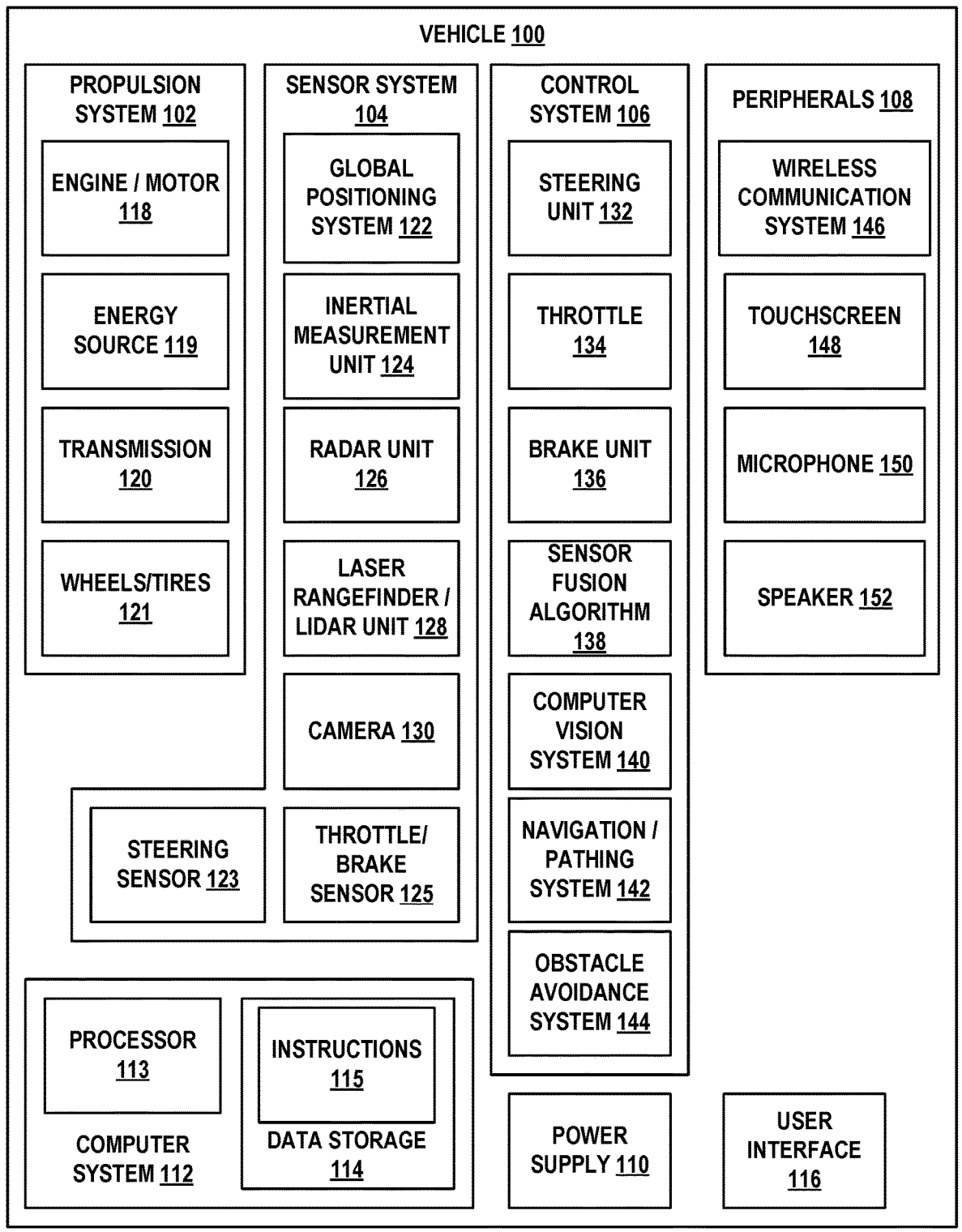
FIG. 1 is a simplified block diagram of a vehicle, in accordance with example embodiments.
Figure 2A:
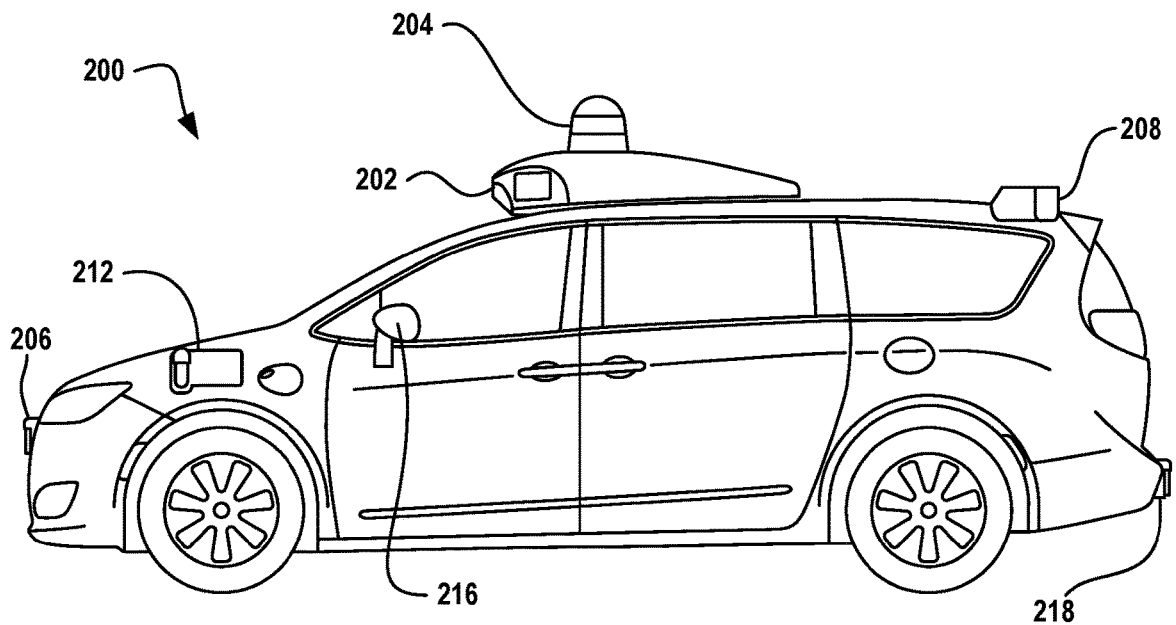
FIGS. 2A, 2B, 2C, 2D, and 2E illustrate a physical configuration of a vehicle, in accordance with example embodiments.
Figure 2B:
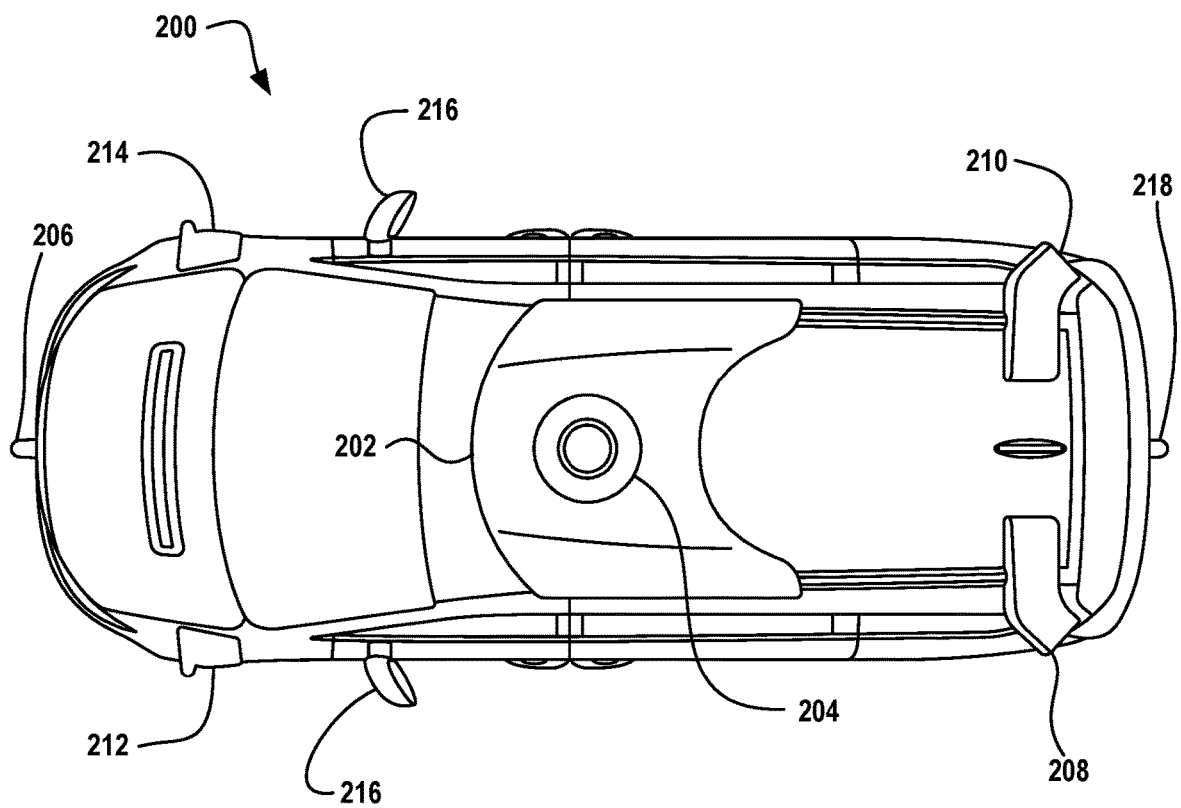
Figure 2C:
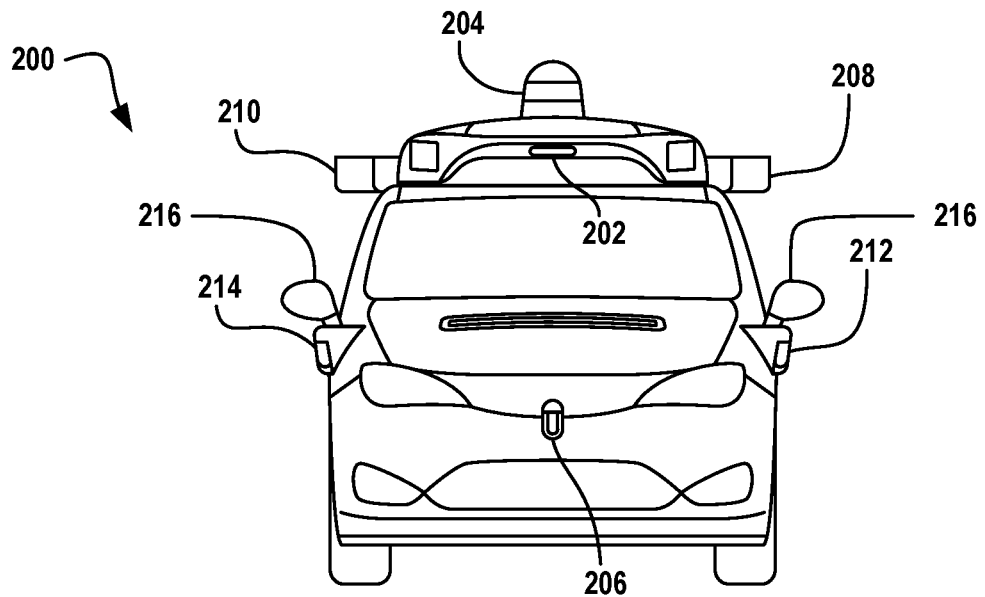
Figure 2D:
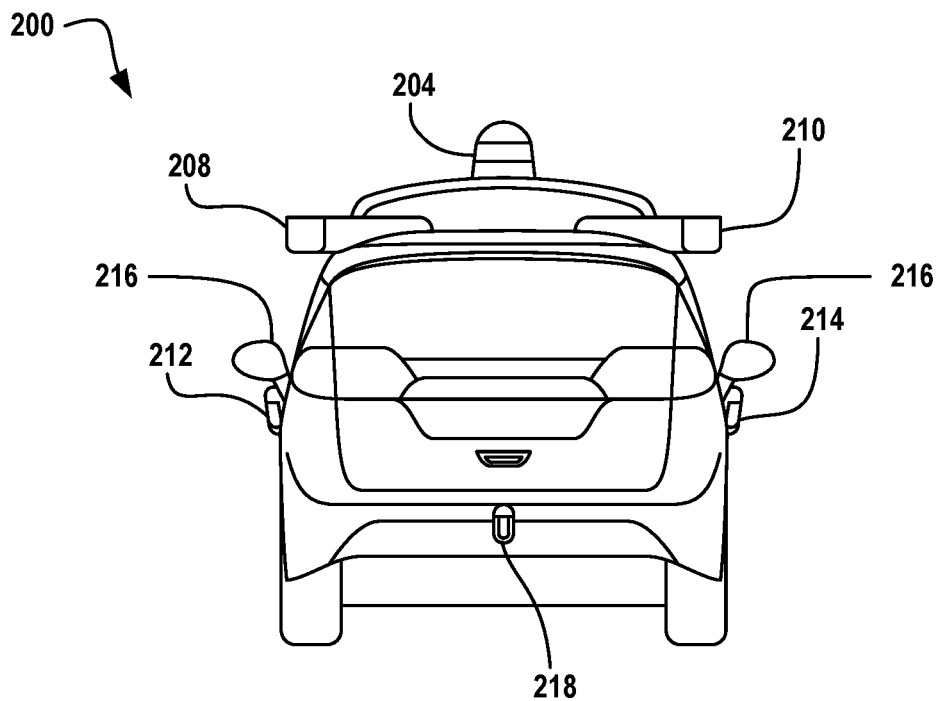
Figure 2E:
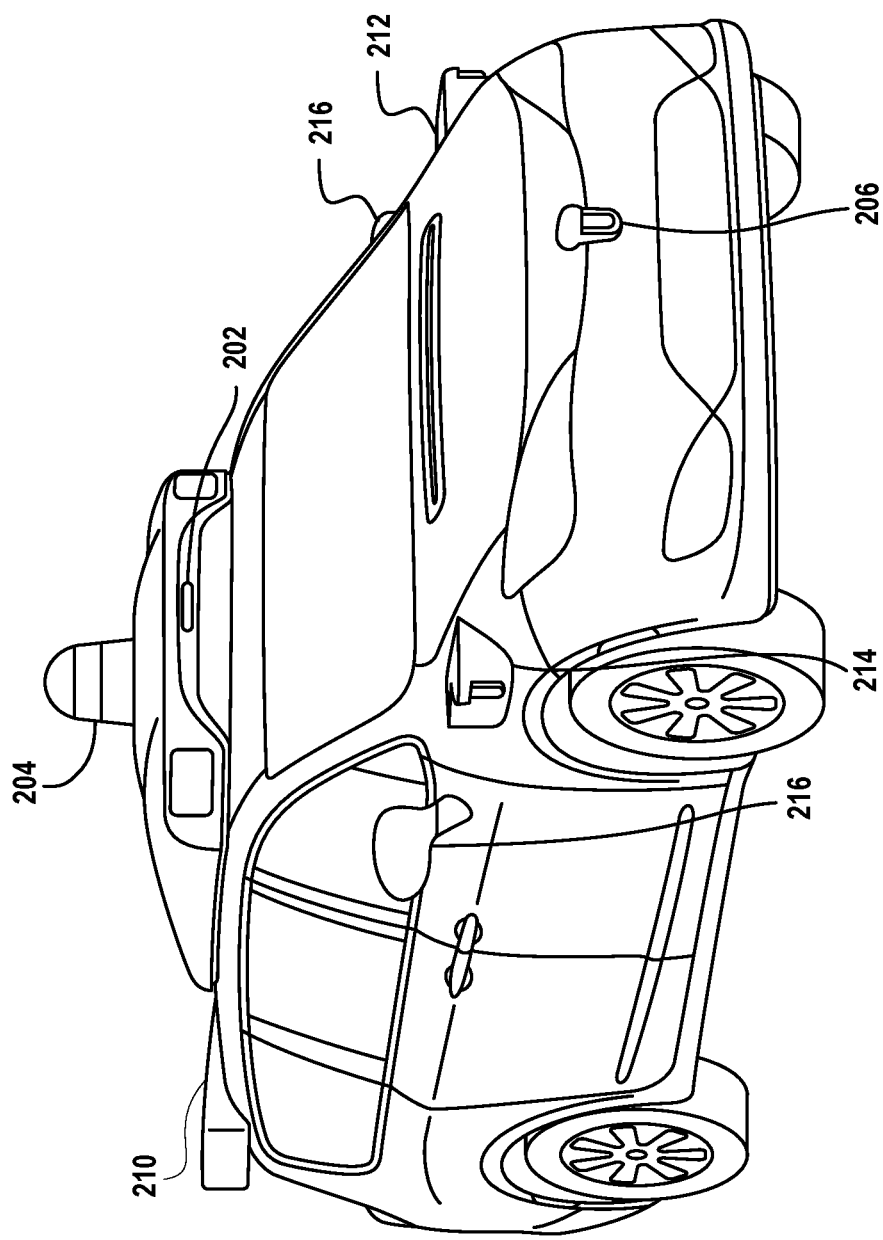

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein. Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Unless otherwise noted, figures are not drawn to scale.

I. Overview

Autonomous vehicles or vehicles operating in an autonomous mode may use various sensors to detect their surroundings. For example, light detection and ranging devices (LIDARs), radio detection and ranging devices (RADARs), and/or cameras may be used to identify objects in a surrounding environment of a vehicle. Such sensors may be used in object detection and avoidance and/or in navigation, for example.

In some examples, the sensors of a vehicle may be calibrated to facilitate reliable and safe operation of the vehicle. In one example, calibration may be performed by using a sensor to detect calibration targets positioned at predetermined locations relative to the sensor. The calibration targets could have predetermined reflectivity characteristics, particular reflectivity patterns and/or arrangements, among other possibilities. Based on calibration data generated by the sensors, hardware and/or software corrections can then be implemented to account for discrepancies between expected and observed sensor measurements.

In some examples, such calibration processes may be performed at regular temporal intervals (e.g., a calibration may be performed every day, every week, every month, etc., for a given sensor). In other examples, a system may schedule a particular vehicle and/or sensor thereon for calibration based on a determination of a likelihood of sensor measurement errors being associated with the sensor. Further, in some examples, such calibration processes may be performed in a vehicle calibration facility that houses calibration equipment configured for calibrating the sensors of the vehicle. For example, a garage facility may have multiple arrangements of calibration targets used to calibrate different sensors in any of a plurality of vehicles having similar sensor configurations. Other examples are possible.

More generally, some examples in the present disclosure relate to automated calibration, verification, and/or testing of vehicle-mounted sensors.

One example method disclosed herein involves monitoring a vehicle using one or more external sensors (e.g., LIDARs, cameras, etc.) mounted in predetermined locations at a vehicle calibration facility (e.g., garage). The method also involves causing the vehicle to navigate, in an autonomous driving mode, to a first calibration position based on at least the sensor data collected by the one or more external sensors. For instance, the first calibration position may correspond to a calibration station configured for calibrating one or more particular sensors on the vehicle.

In one implementation, an external computing system of the facility may communicate with a computing system of the vehicle to provide the sensor data from LIDARs, cameras, etc., mounted at predetermined locations in the facility. The computing system of the vehicle may then use the received sensor data to drive the vehicle (in the autonomous driving mode) from the current position of the vehicle to the first calibration station (e.g., instead of relying on potentially inaccurate measurements indicated by uncalibrated sensors of the vehicle). In another implementation, the external computing system may generate and transmit navigation instructions to the computing system of the vehicle based on measurements of the current position of the vehicle (indicated by the external sensor(s)) relative to the first calibration position.

In some examples, the method also involves causing a first sensor of the vehicle to perform a first calibration measurement while the vehicle is at the first calibration position; and calibrating the first sensor based on the first calibration measurement.

In one example, the first calibration position may be a predetermined position relative to a calibration target (e.g., patterned object, etc.). In this example, the first sensor (and optionally one or more other sensors of the vehicle) may be a LIDAR, RADAR, camera, ultrasound sensor, infrared sensor, and/or any other type of sensor capable of scanning the calibration target. Measurements indicated by the sensor can then be compared with expected values based on the predetermined position of the calibration target.

In another example, the first calibration position may be a moving platform on which the vehicle is positioned. The moving platform can then be moved in a predetermined manner (e.g., rotated, tilted, etc.), and the first sensor may provide measurements related to the movements caused by the moving platform (e.g., measurements of the position, orientation, acceleration, speed, etc., of the vehicle and/or the first sensor). The measurements by the first sensor could then be compared with expected values associated with the predetermined manner of motion of the vehicle caused by the moving platform to calibrate the first sensor.

In some examples, the method also involves causing the vehicle to navigate (in the autonomous driving mode) from the first calibration position to a second calibration position in the vehicle calibration facility, and calibrating a second sensor of the vehicle based on a second calibration measurement performed by the second sensor while the vehicle is at the second calibration position. For instance, each calibration position may include a respective arrangement of calibration targets suitable for testing one or more particular types of sensor (e.g., LIDAR, RADAR, camera, etc.). As an example, the first sensor may provide measurements related to motion, position, orientation, etc., of the vehicle (e.g., accelerometer, gyroscope, compass, etc.) and the second sensor may provide measurements related to objects in the environment of the vehicle (e.g., LIDAR, RADAR, camera, etc.). Thus, in various examples, different calibration station configurations (located at different calibration positions in the vehicle calibration facility) can be used to calibrate different types of sensors.

II. Example Vehicle Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. In some examples, vehicle 100 may operate in an autonomous mode by receiving and/or generating control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch, roll, and/or yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). In some examples, the photodetectors can be arranged into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIG-BEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder/LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object.

The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
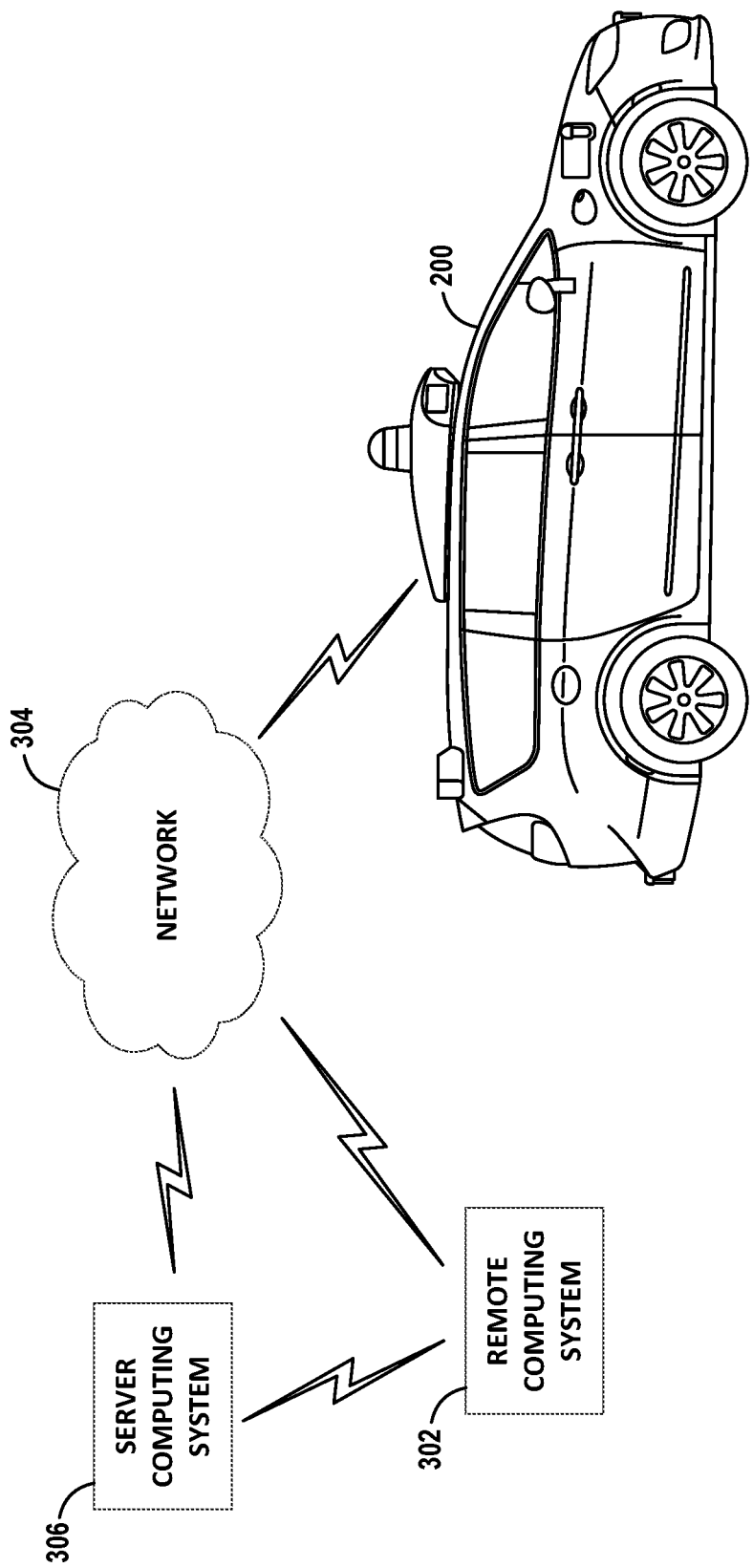
FIG. 3 is a conceptual illustration of wireless communication between various computing systems and a vehicle, in accordance with example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. In some examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. In one example, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In yet another example, remote computing system 302 may be a computing device with a touchscreen operable by the passenger of vehicle 200.

In some embodiments, one or more operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation, a vehicle (e.g., vehicle 200) may receive data representing objects in an environment in which the vehicle operates (also referred to herein as "environment data") in a variety of ways. A sensor system on the vehicle may provide the environment data indicative of objects in the environment. For example, the vehicle may have various sensors, such as a camera, a radar unit, a laser range finder, a microphone, a radio unit, and/or other sensors. One or more of these sensors may communicate environment data to a processor in the vehicle about information each respective sensor receives.

While operating in an autonomous mode, in some examples, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating in the autonomous mode, the sensor system may be receiving environment data. The processing system of the vehicle may alter the control of the vehicle based on environment data received from the various sensors. In one example, the vehicle may alter a velocity and/or steering direction of the vehicle in response to environment data from the various sensors. The vehicle may change velocity and/or steering direction in order to avoid obstacles and/or to conform with traffic laws, among other examples. For instance, when a processing system in the vehicle identifies objects near the vehicle, the vehicle may change its velocity or alter its movement in another way.

In some examples, when the vehicle detects an object but is not highly confident in the detection of the object, the vehicle can request a human operator (or a more powerful computer) to perform one or more remote assistance tasks, such as (i) confirm whether the object is in fact present in the environment (e.g., confirm presence of a stop sign), (ii) confirm the identification of the object, (iii) correct the identification if the identification was incorrect and/or (iv) provide a supplemental instruction (or modify a present instruction) for the autonomous vehicle. In some examples, remote assistance tasks may also include the human operator providing an instruction to control operation of the vehicle (e.g., instruct the vehicle to stop at a stop sign if the human operator determines that the object is a stop sign). In other examples, the vehicle itself may alternatively or additionally control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In various examples, the environment data may come from a camera (e.g., image or video data), a LIDAR unit (e.g., LIDAR point cloud data), a RADAR unit (e.g., RADAR data), a microphone/ultrasound sensor (e.g., audio data), and/or other type of sensor. Thus, the vehicle may analyze captured image data, video data, LIDAR data, RADAR data, audio data, and/or other type of sensor data to identify objects in the environment.

III. Example Vehicle Calibration Systems

Figure 4:
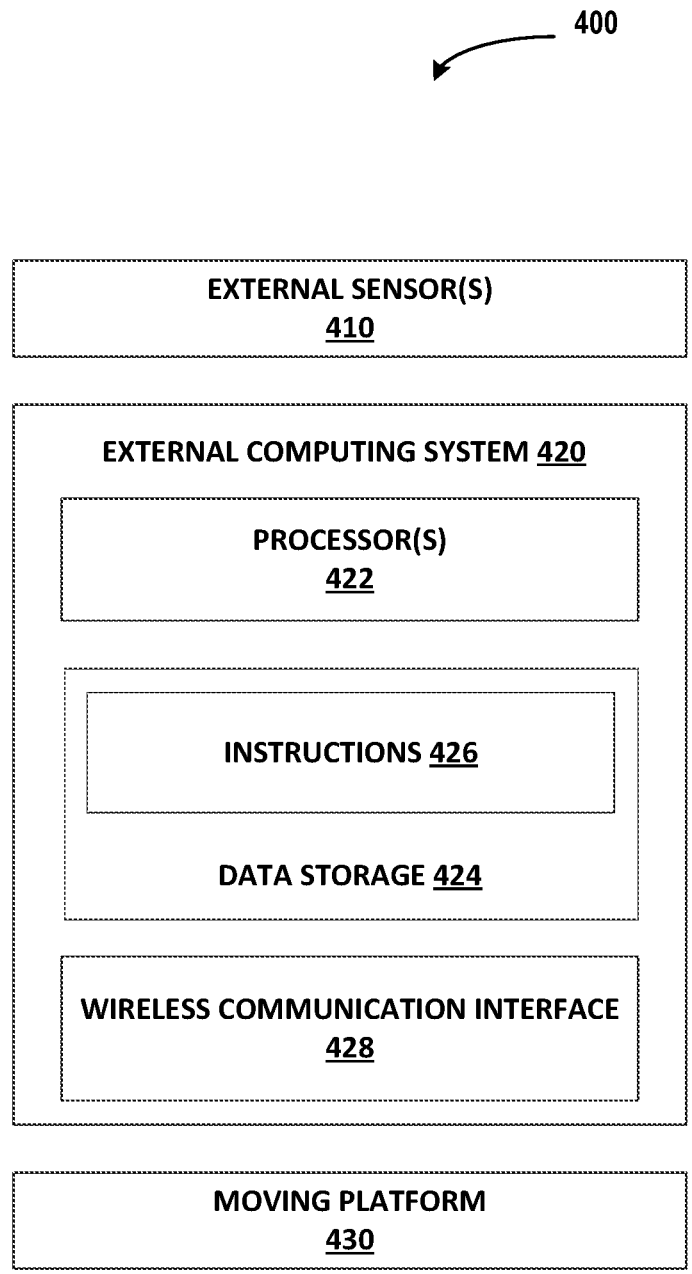
FIG. 4 is a simplified block diagram of a vehicle calibration system, in accordance with example embodiments.

FIG. 4 is a simplified block diagram of a vehicle calibration system 400, in accordance with example embodiments.

In some examples, system 400 can be used in a vehicle calibration facility to control and/or assist the navigation of a vehicle inside the vehicle calibration facility, as well as the calibration of sensors mounted to the vehicle. As shown, system 400 includes one or more external sensors 410, an external computing system 420, and a moving platform 430.

External sensor(s) 410 may include one or more LIDAR(s), RADARs, cameras, ultrasound sensors, infrared sensors, and/or any other type of sensor configured to scan a vehicle and/or measure the position of the vehicle inside a vehicle calibration facility. To that end, in some examples, the external sensor(s) 410 may be physically arranged at predetermined location(s) in the vehicle calibration facility. For example, a LIDAR sensor can be mounted on a wall of the vehicle calibration facility at a predetermined position (e.g., 10 meters from a gate of the facility, etc.). In this example, a distance measurement to a vehicle by the LIDAR sensor can be used to determine a current relative position of the vehicle inside the vehicle calibration facility. Other examples are possible.

External computing system 420 may be similar to remote computing system 302 and/or server computing system 306. For example, external computing system 420 may be configured to wirelessly communicate information with a vehicle (e.g., vehicle 200). As shown, external computing system 420 includes one or more processors 422, data storage 424, and wireless communication interface 428.

In some examples, external computing system 420 may be coupled to external sensor(s) 410 and configured to receive and/or process sensor data collected by external sensor(s) 410. Additionally, in some examples, external computing system 420 may be coupled to moving platform 430 and configured to control and/or otherwise operate moving platform 430. To that end, although not shown, external computing system 420 may be electrically coupled to external sensor(s) 420 and/or moving platform 430 via wired and/or wireless connections. Thus, external computing system 420 may be configured to perform various operations to facilitate calibrating vehicle-mounted sensors, such as any of the operations described above among other examples.

Processor(s) 422 may include at least one microprocessor and/or other digital/analog circuitry configured to execute instructions 426 stored in a non-transitory, computer-readable medium, such as data storage 424. By executing instructions 426, processor(s) 422 may cause external computing system 420 to perform various operations, such as the operations described above for example. In some embodiments, computer system 420 may include a plurality of computing devices that may serve to control individual components or subsystems of system 400 in a distributed fashion.

Data storage 424 may contain additional instructions as well, including instructions to transmit data to, receive data from, interact with, and/or control one or more of external sensor(s) 410, wireless communication interface 428, and/or moving platform 430. In addition to instructions 426, data storage 424 may store data such as calibration measurements collected by sensors mounted to one or more vehicles (e.g., similar to vehicles 100 and/or 200), calibration target configurations and/or other information related to calibration stations in the vehicle calibration facility, among other types of information. Such information may be used by system 400 and computer system 420 to facilitate operation of a vehicle in an autonomous, semi-autonomous, and/or manual driving mode inside a vehicle calibration facility.

Wireless communication interface 428 may wirelessly communicate with one or more devices (or vehicles) directly or via a communication network. For example, wireless communication interface 428 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE), among other examples. Alternatively, wireless communication interface 428 may communicate with a wireless local area network (WLAN) using WiFi or other possible connections. Wireless communication interface 428 may also communicate directly with a device (or vehicle) using an infrared link, BLUETOOTH®, or ZIG-BEE®, for example. Other wireless protocols, such as various vehicular communication systems, are possible within the context of the disclosure. For example, wireless communication interface 428 may include one or more dedicated short-range communications (DSRC) devices that could include public and/or private data communications.

Moving platform 430 may include a solid platform configured to support a vehicle and one or more actuators configured to move the vehicle in a particular manner. For example, moving platform 430 may be configured to cause a particular translation motion (e.g., forward, backward, up, down, sideway, etc.) and/or a particular rotation motion (e.g., yaw, pitch, or roll rotation). Thus, in some examples, moving platform 430 can be used to move the vehicle in a particular manner to facilitate calibration of inertial sensors (e.g., IMU 124) of the vehicle.

Figure 5:
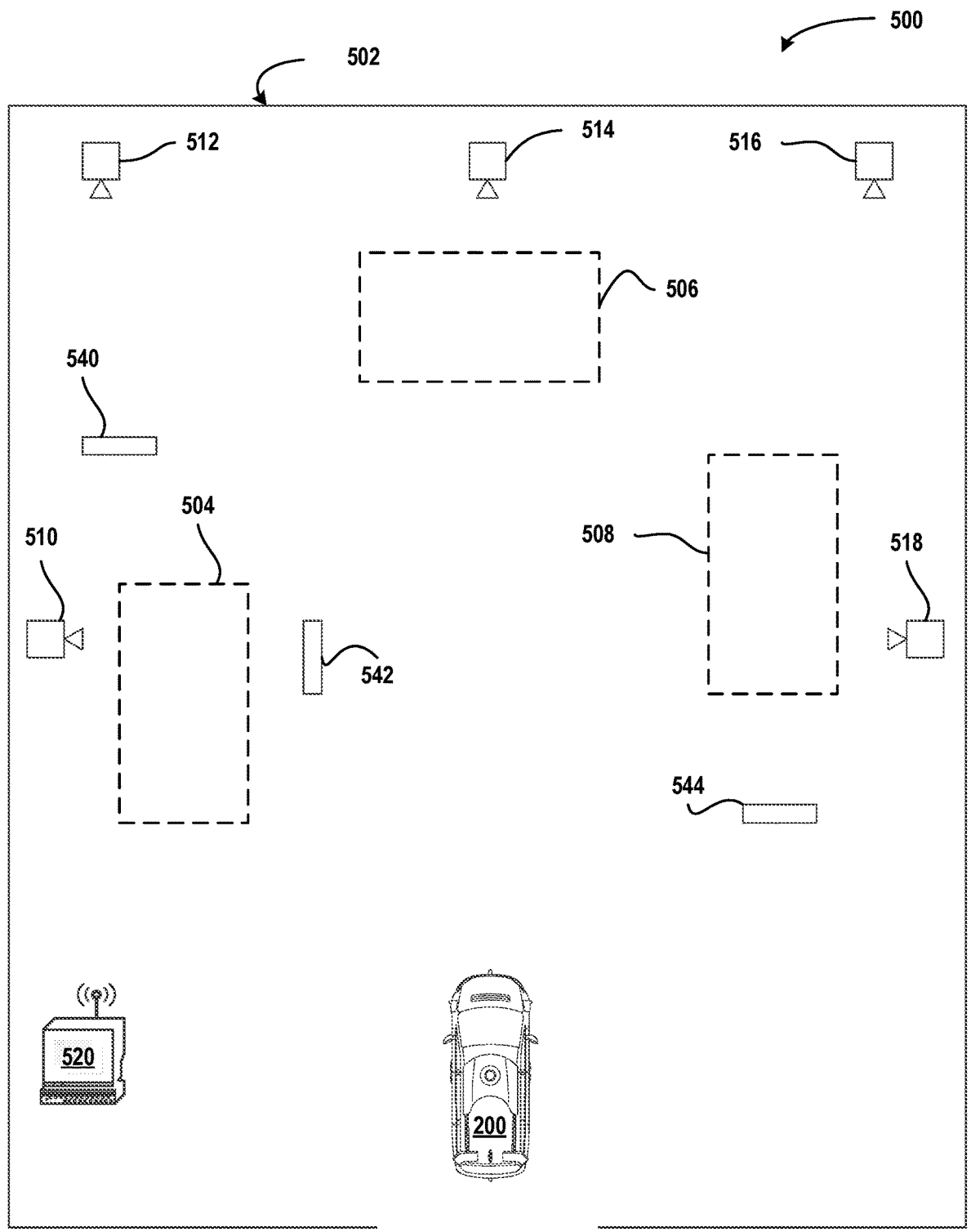
FIG. 5 is a conceptual illustration of a vehicle calibration system, in accordance with example embodiments.

FIG. 5 is a conceptual illustration of a vehicle calibration system 500, in accordance with example embodiments. FIG. 5 illustrates an example scenario for calibrating one or more sensors of a vehicle 200 using system 500. As shown, system 500 includes a vehicle calibration facility 502, a plurality of calibration positions 504, 506, 508 inside facility 502, a plurality of external sensors 510, 512, 514, 516, 518, an external computing system 520, and a plurality of calibration targets 540, 542, 544.

Vehicle calibration facility 502 may include any suitable structure equipped with an arrangement of components for calibrating vehicle-mounted sensors. For example, facility 502 may include a garage, a parking structure, or a warehouse, among other examples. In some embodiments, facility 502 may be configured as a controlled environment (e.g., indoor space, etc.) that reduces an amount of noise signals (e.g., ambient light, background sounds, etc.), which may interfere with measurements by one or more particular types of sensors in vehicle 200.

Calibration positions 504, 506, 508 may correspond to predetermined locations inside facility 502 (e.g., calibration stations).

Each calibration position may be configured for calibrating one or more particular types of sensors in vehicle 200. For instance, calibration position 504 may be at a first location associated with calibration targets 540 and 542, and calibration position 508 may be at another location associated with calibration target 544. In this instance, system 500 may be configured to use calibration position 504 for calibrating a first sensor (e.g., LIDAR, etc.) of vehicle 200; and calibration position 508 for calibrating a second different sensor (e.g., camera, etc.) of vehicle 200.

In some embodiments, system 500 may include one or more additional components associated with a particular calibration position instead of or in addition to calibration targets 540, 542, 544. For example, although not shown, calibration position 506 may include a moving platform (e.g., similar moving platform 430) configured to support vehicle 200 when vehicle 200 is at calibration position 506. In this example, the moving platform can be actuated to move the vehicle according to predetermined movement characteristics to facilitate calibrating a particular type of sensor (e.g., IMU) in vehicle 200. Other examples are possible.

External sensors 510, 512, 514, 516, 518 may be similar to external sensors 410 of system 400. For instance, external sensors 510, 512, 514, 516, 518 may include one or more LIDARs, cameras, RADARs, and/or another type of sensor configured to scan vehicle 200 and provide outputs indicative of a relative position of vehicle 200 inside facility 502. To facilitate this, as shown, external sensors 510, 512, 514, 516, 518 may be physically arranged at predetermined locations inside facility 502. By way of example, sensor 514 may be a LIDAR configured to measure a distance between the LIDAR 514 and vehicle 200. In this example, computing system 520 may then estimate a relative position of vehicle 200 in facility 502 based on at least the measurement from sensor 514 and the predetermined location of sensor 514 in facility 502.

External computing system 520 may be similar to external computing system 420 of system 400. For instance, computing system 520 may be configured to wirelessly communicate with a computing system (not shown) of vehicle 200, receive outputs from and/or control external sensors 512, 514, 516, 518, or perform one or more other processes and system operations described in the present disclosure.

Calibration targets 540, 542, and 544 may include various types of surfaces, objects, and/or any other structures having predetermined characteristics (e.g., colors, reflectivities, patterns, sizes, cross-sections, etc.) suitable for measurement by one or more types of sensors in vehicle 200. To that end, in some examples, one or more of calibration targets 540, 542, 544 may be arranged at a respective predetermined location relative to a particular calibration position. By way of example, calibration target 540 may be positioned at a predetermined distance from calibration position 504. In this example, a particular sensor of vehicle 200 may perform a calibration measurement (while the vehicle is at position 504) of a distance to calibration target 540 which can then be compared with the predetermined distance to determine potential measurement errors in the output of the particular sensor. Other examples are possible.

It is noted that system 500 may include fewer or additional components than those shown. For example, although FIG. 5 shows three calibration positions 504, 506, 508, system 500 may alternatively include fewer or more calibration positions. As another example, system 500 may alternatively include fewer or more external sensors than the five sensors 510, 512, 514 516, 518 shown. More generally, it should be understood that the numbers, locations, shapes, and sizes of the various components of system 500 are illustrated as shown in FIG. 5 only for the sake of example. In alternative embodiments, different numbers, locations, shapes, and/or sizes of the various components of system 500 are possible.

IV. Example Methods

Figure 6:
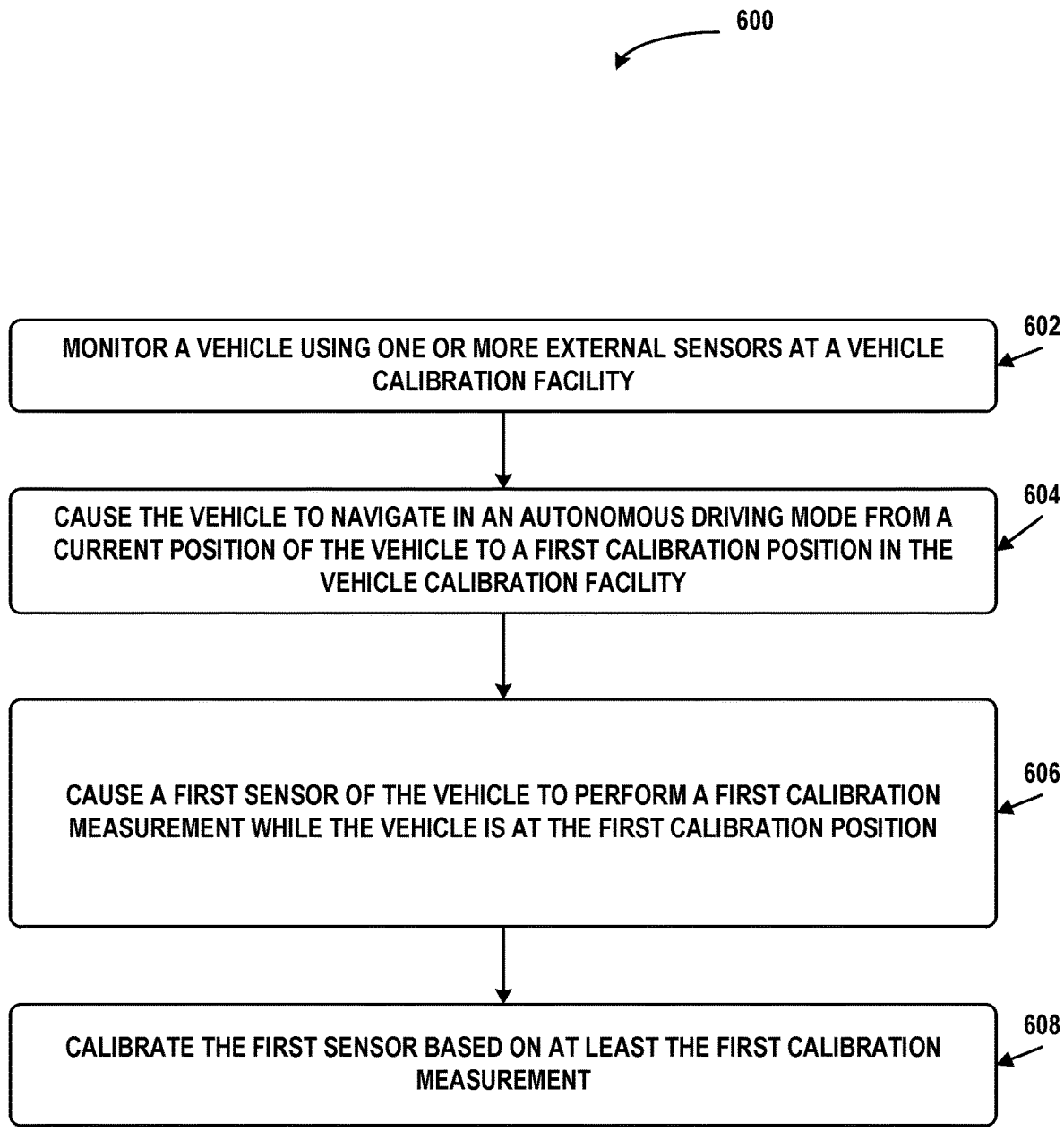
FIG. 6 is a flow chart of a method, in accordance with example embodiments.

FIG. 6 is a flowchart of a method 600, according to example embodiments. Method 600 presents an embodiment of a method that could be used with any of vehicle 100, vehicle 200, system 302, system 306, system 400, and/or system 500, for example. Method 600 may include one or more operations, functions, or actions as illustrated by one or more of blocks 602-608. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 600 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 600 and other processes and methods disclosed herein, each block in the flowchart may represent circuitry that is wired to perform the specific logical functions in the process.

At block 602, method 600 involves monitoring a vehicle using one or more external sensors at a vehicle calibration facility. Sensor data collected by the one or more external sensors may be indicative of a relative position of the vehicle in the vehicle calibration facility. Referring back to FIG. 5 for example, external computing system 520 (and/or any other computing system of the present disclosure) may be configured to estimate the relative position of vehicle 200 inside vehicle calibration facility 502 based on outputs from one or more of external sensors 510, 512, 514, 516, 518. Thus, in some implementations, the one or more external sensors at block 602 may include a plurality of sensors. In alternative implementations however, the one or more external sensors at block 602 may correspond to a single sensor.

At block 604, method 600 involves causing the vehicle to navigate in autonomous driving mode from a current position of the vehicle to a first calibration position in the vehicle calibration facility. Causing the vehicle to navigate to the first calibration position at block 604 may be based on the sensor data collected by the one or more external sensors at block 602.

In a first example, referring back to FIG. 5, external computing system 520 may determine the current position of vehicle 200 inside facility 502 based on outputs from external sensors 510, 512, 514, 516, and/or 518. External computing system 520 may then communicate an indication of the determined current position (and the first calibration position 504) to a computing system of vehicle 200 (e.g., computer system 112 of vehicle 100).

In a second example, the external computing system 520 may alternatively transmit an indication of the sensor data collected by the external sensors to vehicle 200, and a computing system of vehicle 200 may then use the sensor data to navigate to the first calibration position in the autonomous driving mode.

In a third example, the external computing system 520 may alternatively generate navigation instructions for vehicle 200. For instance, the generated navigation instructions may specify navigation maneuvers sufficient to move the vehicle from the current position to the first calibration positions (e.g., change steering angle to 45 degrees, then drive 1 meter, then change steering angle to 70 degrees, then drive 5 meters, etc.).

Other examples are possible. More generally, in various examples, the vehicle may receive information related to its relative position in the vehicle calibration facility and indicated by the sensor data collected using the one or more external sensors. Vehicle 200 may then operate in the autonomous mode, based on the sensor indicated by the external sensor(s), to navigate from the current position of the vehicle (e.g., the position shown in FIG. 5) to the first calibration position (e.g., calibration position 504). For instance, vehicle 200 may utilize a control system (e.g., similar to control system 106 of vehicle 100) to control propulsion and steering system of the vehicle (e.g., propulsion system 102, steering unit 132, etc.) autonomously to perform the necessary navigation maneuvers for driving the vehicle from the current position to the first calibration position.

Thus, in some examples, autonomous driving subsystems of the vehicle may utilize the sensor data collected by the external sensor(s) of the vehicle calibration facility instead of using the sensors of vehicle 200. With this arrangement, in some scenarios, vehicle 200 may be able to navigate along a relatively more accurate navigation path from its current position to the first calibration position 504 as compared to a given navigation path determined based on potentially erroneous measurements from uncalibrated sensors of the vehicle.

In some examples, external computing system 520 may transmit information to vehicle 200 via a wireless communication interface (e.g., similar to interface 428 of system 400, etc.) of the external computing system. Further, in these examples, vehicle 200 may receive the transmitted information via a wireless communication system (e.g., similar to system 146 of vehicle 100, etc.).

In some examples, the one or more external sensors are located at one or more respective predetermined locations in the vehicle calibration facility. Referring back to FIG. 5 for example, the relative locations of external sensors 510, 512, 514, 516, 518 in vehicle calibration facility 502 could be predetermined. In these examples, causing the vehicle to navigate to the first calibration position at block 604 may be further based on the one or more respective predetermined locations, in line with the discussion in the description of FIG. 5.

In some embodiments, a system of method 600 may be configured to use one or more vehicle calibration facilities (similar to facility 502) for calibration of sensors on any of a fleet of similarly configured vehicles (e.g., a fleet of autonomous vehicles having similar sensor systems, etc.). In these embodiments, the system may select vehicles and/or sensors thereon for calibration for a variety of reasons. For example, the system may select a particular sensor of a particular vehicle based on a time period since a last calibration of the particular sensor was performed. As another example, the system may select a particular sensor of a particular vehicle in response to detecting a threshold difference between sensor data collected by the particular sensor and other sensor data collected by another sensor of another vehicle when the other vehicle was at a similar location in the environment as the particular vehicle. In yet another example, the vehicle itself may detect a threshold change in the output of its sensor and trigger selection of that sensor for calibration. Other examples are possible. To that end, in some embodiments, the vehicle may be instructed to travel (e.g., in an autonomous driving mode) to the vehicle calibration facility in response to the selection of the first sensor of the vehicle for calibration.

Accordingly, in some examples, method 600 may also involve selecting the first sensor for calibration. In these examples, causing the vehicle to navigate to the first navigation position at block 604 may be further based on selecting the first sensor for calibration. In a first example, referring back to FIG. 3, server computing system 306 and/or remote computing system 302 may select the first sensor for calibration and transmit a request to vehicle 200 (via network 304) for navigating to a vehicle calibration facility to perform the calibration. For instance, system 302 and/or 306 may select the first sensor of vehicle 200 in response to passage of time since a previous calibration was performed or in response to detecting a change in the performance of the first sensor. In a second example, referring back to FIG. 1, computer system 112 may detect a threshold change in outputs from that one of the sensors in sensor system 104 (e.g., LIDAR 128, etc.) and responsively select that sensor for calibration. Other examples are possible.

In some examples, method 600 may involve determining a likelihood of measurement errors by the first sensor based on previously collected calibration data; and selecting the first sensor for calibration based on the determination. For instance, in line with the discussion above, the determination of the likelihood of measurement errors may be based on passage of time since a previous calibration measurement was collected from the first sensor. Alternatively or additionally, for instance, the determination of the likelihood of measurement errors may be based on a comparison of a recent measurement by the first sensor with a previous measurement by the first sensor or another sensor.

Accordingly, in a first example, the previously collected calibration data may comprise previously collected calibration measurements performed by the first sensor of the vehicle. In this example, the determination of the likelihood of measurement errors may optionally be further based on collection times of the previously collected calibration measurements, in line with the discussion above.

In a second example, the previously collected calibration measurements may be performed by other sensors of one or more other vehicles, in line with the discussion above.

In some examples, causing the vehicle to navigate to the first calibration position at block 604 may involve positioning the vehicle on a moving platform at the first calibration position. In these examples, method 600 may also involve causing, via the moving platform, the vehicle to move according to predetermined movement characteristics, in line with the discussion in the description of moving platform 430 of FIG. 4. For example, the first sensor may be an IMU (e.g., IMU 124) and the moving platform can be used to simulate certain movement characteristics (e.g., rotation motions, translation motions) and determine whether the outputs from the first sensor match the predetermined movement characteristics.

At block 606, method 600 involves causing a first sensor of the vehicle to perform a first calibration measurement while the vehicle is at the first calibration position.

In a first example, referring back to FIG. 2A, the first sensor at block 606 may correspond to a single sensor of vehicle 200 (e.g., sensor 204).

In a second example, the first sensor at block 606 may alternatively include multiple different sensors of vehicle 200 (e.g., sensor 204 and 206) of the same type or modality (e.g., LIDARs, etc.) and that can be calibrated using the same one or more calibration targets associated with the first calibration position (e.g., calibration targets 540 and 542 shown in FIG. 5).

In a third example, the first sensor at block 606 may alternatively include multiple different sensor of vehicle 200 (e.g., sensors 202 and 204) that have different types or modalities (e.g., a LIDAR and a camera) but that can also be calibrated using the same one or more calibration targets (e.g., calibration targets 540 and 542 shown in FIG. 5). Other examples are possible.

In line with the discussion above, a system of method 600 (e.g., computing systems 112, 302, 306, 420, and/or 520) may be configured to cause the first sensor to collect the first calibration measurement at block 606 when the vehicle is at the first calibration position. Referring back to FIG. 1 for example, computer system 112 may operate any of the sensors in sensor system 104 that are suitable for calibration at the first calibration position (e.g., LIDAR 128, RADAR 126, and/or camera 130, etc.) to collect the first calibration measurement.

At block 608, method 600 involves calibrating the first sensor based on at least the first calibration measurement.

In some implementations, the calibration at block 608 may involve a system of method 600 comparing the first calibration measurement with a given measurement expected from a calibrated sensor at the first calibration position. Referring back to FIG. 5 for example, a LIDAR distance measurement to calibration target 540 indicated by the first sensor may be compared with an actual distance between the first sensor and calibration target 540. As another example, color data in a camera image indicated by the first sensor may be compared with given color data in another camera image captured by a calibrated camera sensor that was similarly positioned at the first calibration position. Other examples are possible.

In one implementation, if a discrepancy between the first calibration measurement and the expected given measurement is detected, then the system of method 600 may be configured to generate and/or update calibration parameters (e.g., correction factors, calibration coefficients, alignment offsets, etc.) for the first sensor which can be used to account for measurement errors by the first sensor. In another implementation, a maintenance request can be transmitted (e.g., to server computing system 306 and/or remote computing system 302) that identifies the vehicle and/or the first sensor for maintenance (e.g., for replacing or otherwise modifying a hardware component of the first sensor, etc.). Other implementations are possible.

As noted above, in some examples, the various functions described in any of the blocks of method 600 and/or other methods of the present disclosure can be implemented using one or more systems of the present disclosure. In a first example, the calibration at block 608 can be performed at a computer system (e.g., computer system 112) in the same vehicle that includes the first sensor and the second sensor. In a second example, the calibration at block 608 may be performed using one or more processors in an external computing system (e.g., the computing system of another vehicle, a remote computing system such as external computing system 420, etc.) that receives data from the vehicle that includes the first sensor and the second sensor. Other examples are possible as well.

In some examples, method 600 involves causing the vehicle to navigate in the autonomous driving mode, based on at least the sensor data collected by the one or more external sensors, from the first calibration position to a second calibration position in the vehicle calibration facility, causing a second sensor of the vehicle to perform a second calibration measurement while the vehicle is at the second calibration position, and calibrating the second sensor based on at least the second calibration measurement. Referring back to FIG. 5 for example, vehicle 200 may navigate from the first calibration position 504 (after calibrating the first sensor) to the second calibration position 506 where a system of method 600 may then calibrate the second sensor (e.g., IMU, etc.) at the second calibration position 506, in a similar manner to the discussion at blocks 604-608 for the calibration of the first sensor.

In some examples, method 600 may also involve obtaining, from data storage, calibration data indicative of previous calibration measurements performed by respective sensors of a plurality of vehicles at different respective calibration times. The previous calibration measurements may include a previous calibration measurement performed by the first sensor of the vehicle at a given calibration time. In these examples, method 600 may also involve determining a likelihood of failure of the first sensor based on the calibration data and the given calibration time; and selecting the vehicle for calibration based on the determined likelihood.

By way of example, a system of method 600 may process calibration data from multiple vehicles having respective sensors configured similarly to the first sensor of the vehicle. For instance, each of the plurality of vehicles may include a respective LIDAR sensor configured and mounted similarly to LIDAR 204 of vehicle 200. In this example, the system may determine, based on the calibration data, an average time period after a calibration event at which a particular sensor is expected to provide outputs associated with calibration measurements errors. The system may then select the vehicle of block 602 in response to passage of a similar time period after the last time the first sensor was calibrated. Other examples are possible.

Figure 7:
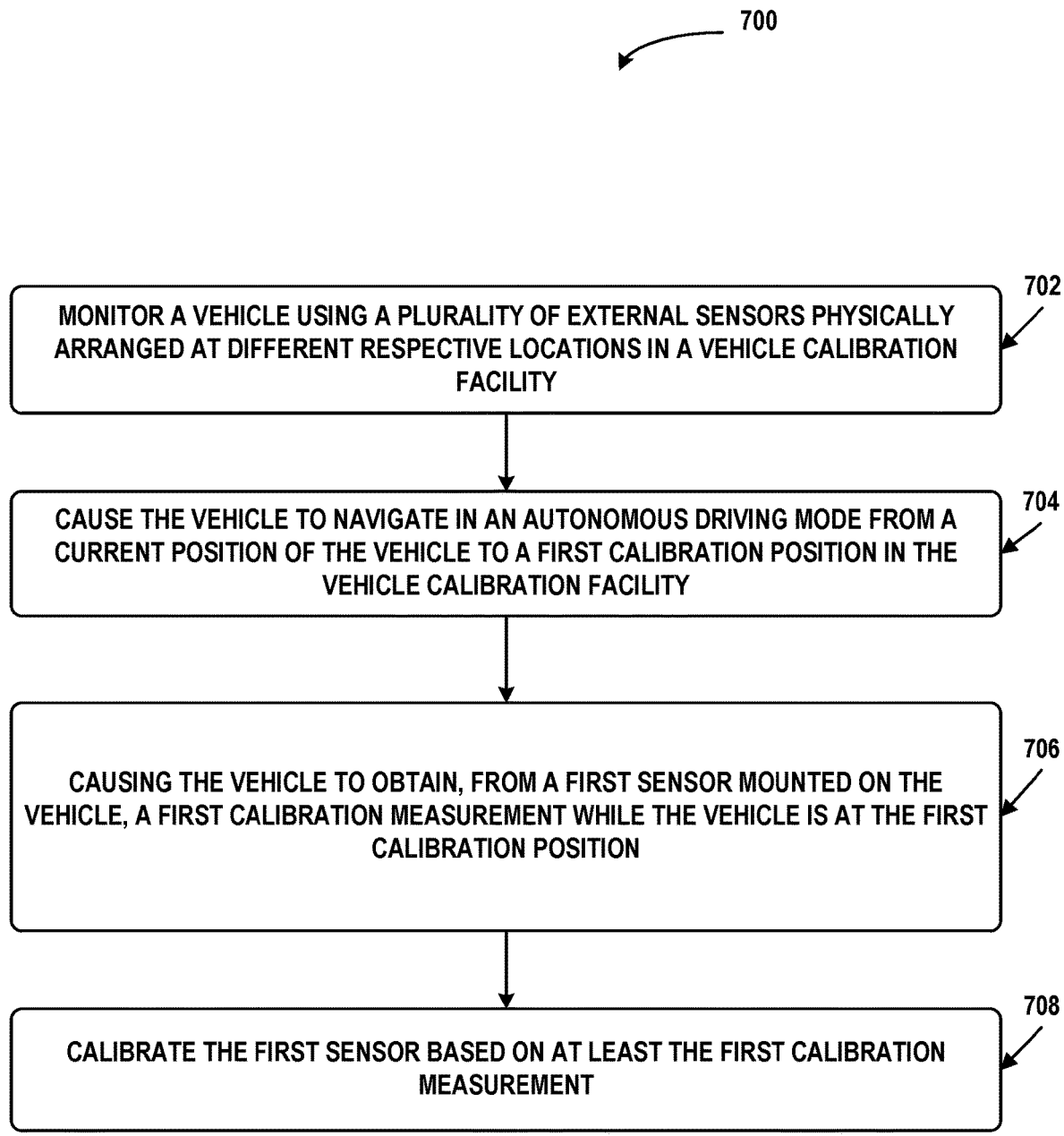
FIG. 7 is a flow chart of another method, in accordance with example embodiments.

FIG. 7 is another flowchart of a method 700, according to example embodiments. Method 700 presents an embodiment of a method that could be used with any of vehicle 100, vehicle 200, system 302, system 306, system 400, and/or system 500, for example. Method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 702, method 700 involves monitoring a vehicle (e.g., vehicle 200) using a plurality of external sensors (e.g., external sensors 510, 512, 514, 516, 518) physically arranged at different respective locations in a vehicle calibration facility (e.g., facility 502). For example, block 702 may be similar to block 602 of method 600.

At block 704, method 700 involves causing the vehicle to navigate in an autonomous driving mode from a current position of the vehicle to a first calibration position in the vehicle calibration facility. For example, block 704 may be similar to block 604 of method 600.

In some examples, causing the vehicle to navigate to the first calibration position at block 704 comprises transmitting, via a wireless communication interface, an indication of the sensor data and an indication of the physical arrangement of the plurality of external sensors for receipt by a computing system of the vehicle. Referring back to FIG. 5 for example, external computing system 520 may transmit (via a wireless communication interface similar to interface 428 of system 400) the indications of the sensor data and the physical arrangement of external sensors 510, 512, 514, 516, 518 to a computing system of vehicle 200 (e.g., similar to computer system 112 of vehicle 100). The computing system of vehicle 200 may then use this information to navigate from its current position (e.g., the position shown in FIG. 5) to the first calibration position 504.

Additionally or alternatively, in other examples, causing the vehicle to navigate to the first calibration position at block 704 comprises generating navigation instructions for navigating the vehicle to the first calibration position based on the sensor data collected by the plurality of external sensors and transmitting, via a wireless communication interface, an indication of the generated navigation instructions for receipt by a computing system of the vehicle. Referring back to FIG. 5 for example, external computing system 520 may generate the navigation instructions for operating vehicle 200 in the autonomous driving mode to safely move the vehicle 200 from (or to) any of the current position of vehicle 200 shown in FIG. 5, calibration position 504, calibration position 506, and/or calibration position 508.

At block 706, method 700 may involve causing the vehicle to obtain, from a first sensor mounted on the vehicle, a first calibration measurement while the vehicle is at the first calibration position. For example, block 706 may be similar to block 606 of method 600.

At block 708, method 700 may involve calibrating the first sensor based on at least the first calibration measurement. For example, block 708 may be similar to block 608 of method 600.

Figure 8:
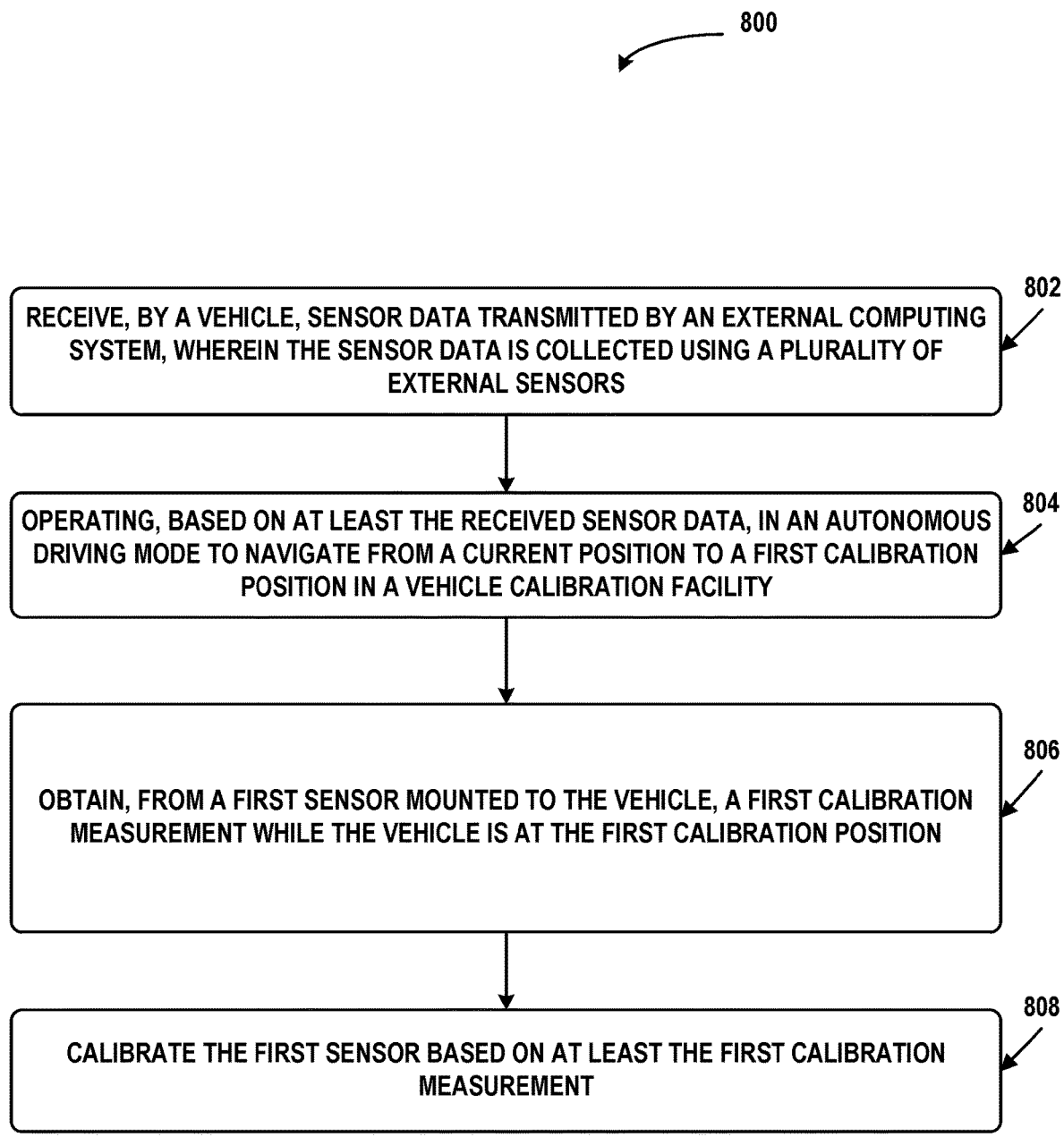
FIG. 8 is a flow chart of yet another method, in accordance with example embodiments.

FIG. 8 is yet another flowchart of a method 800, according to example embodiments. Method 800 presents an embodiment of a method that could be used with any of vehicle 100, vehicle 200, system 302, system 306, system 400, and/or system 500, for example. Method 800 may include one or more operations, functions, or actions as illustrated by one or more of blocks 802-808. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, method 800 involves a vehicle (e.g., vehicle 200) receiving sensor data transmitted by an external computing system (e.g., system 520), in line with the discussion at blocks 602 of method 600 and block 702 of method 700. For instance, the sensor data may be collected using a plurality of external sensors (e.g., external sensors 510, 512, 514, 516, 518).

At block 804, method 800 involves operating, based on at least the received sensor data, in an autonomous driving mode to navigate the vehicle from a current position of the vehicle to a first calibration position in the vehicle calibration facility. For example, block 804 may be similar to block 606 of method 600 and/or block 706 of method 700.

At block 806, method 800 involves the vehicle obtaining, from a first sensor mounted to the vehicle, a first calibration measurement while the vehicle is at the first calibration position, in line with the discussion at block 606 of method 600 and block 706 of method 700. Referring back to FIG. 5 for instance, vehicle 200 may move to calibration position 504 at block 804 and then operate the first sensor (e.g., sensor 204 shown in FIG. 2A, etc.) at block 806 to collect the first calibration measurement while the vehicle is at calibration position 504.

At block 808, method 800 involves calibrating the first sensor based on at least the first calibration measurement. For example, block 808 may be similar to block 608 of method 600 and/or block 708 of method 700.

V. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method comprising:
    monitoring a vehicle using one or more external sensors at a vehicle calibration facility, wherein sensor data collected by the one or more external sensors is indicative of a relative position of the vehicle in the vehicle calibration facility;
    causing the vehicle to navigate in an autonomous driving mode, based on at least the sensor data collected by the one or more external sensors, from a current position of the vehicle to a first calibration position in the vehicle calibration facility;
    in response to the vehicle navigating to the first calibration position based on the sensor data collected by the one or more external sensors, causing a first sensor of the vehicle to perform a first calibration measurement while the vehicle is at the first calibration position; and
    calibrating the first sensor based on at least the first calibration measurement.

2. The method of claim 1, further comprising:
    causing the vehicle to navigate in the autonomous driving mode, based on at least the sensor data collected by the one or more external sensors, from the first calibration position to a second calibration position in the vehicle calibration facility;
    causing a second sensor of the vehicle to perform a second calibration measurement while the vehicle is at the second calibration position; and
    calibrating the second sensor based on at least the second calibration measurement.

3. The method of claim 1, wherein the one or more external sensors are located at one or more respective predetermined locations in the vehicle calibration facility, and wherein causing the vehicle to navigate to the first calibration position is further based on the one or more respective predetermined locations.

4. The method of claim 1, further comprising:
    selecting the first sensor for calibration, wherein causing the vehicle to navigate to the first calibration position is further based on selecting the first sensor for calibration.

5. The method of claim 4, further comprising:
    determining, based on previously collected calibration data, a likelihood of measurement errors by the first sensor of the vehicle, wherein selecting the first sensor is based on the determination of the likelihood.

6. The method of claim 5, wherein the previously collected calibration data comprises previously collected calibration measurements performed by the first sensor of the vehicle.

7. The method of claim 5, wherein the previously collected calibration data comprises calibration measurements performed by one or more other sensors of one or more other vehicles.

8. The method of claim 1, further comprising:
    positioning the vehicle on a moving platform at the first calibration position, wherein causing the vehicle to navigate to the first calibration position comprises positioning the vehicle on the moving platform; and
    causing, via the moving platform, the vehicle to move according to predetermined movement characteristics, wherein the first sensor is configured to provide measurements related to the movement of the vehicle caused by the moving platform.

9. The method of claim 1, further comprising:
    obtaining, from data storage, calibration data indicative of previous calibration measurements performed at different respective calibration times, wherein the previous calibration measurements include a previous calibration measurement performed by the first sensor of the vehicle at a given calibration time; and
    selecting the vehicle for calibration based on the calibration data and the given calibration time.

10. The method of claim 9, wherein the previous calibration measurements also include respective calibration measurements performed by respective sensors of a plurality of different vehicles.

11. A system comprising:
    a plurality of external sensors physically arranged at different respective locations in a vehicle calibration facility;
    a wireless communication interface;
    one or more processors; and
    data storage storing instructions that, when executed by the one or more processors, cause the system to perform operations comprising:
        monitoring a vehicle using the plurality of external sensors, wherein sensor data collected by the plurality of external sensors is indicative of a relative position of the vehicle in the vehicle calibration facility;
        causing the vehicle to navigate in an autonomous driving mode, based on at least the sensor data collected by the plurality of external sensors, from a current position of the vehicle to a first calibration position in the vehicle calibration facility;
        in response to the vehicle navigating to the first calibration position based on the sensor data collected by the plurality of external sensors, causing the vehicle to obtain, from a first sensor mounted on the vehicle, a first calibration measurement while the vehicle is at the first calibration position; and calibrating the first sensor based on at least the first calibration measurement.

12. The system of claim 11, wherein causing the vehicle to navigate from the current position to the first calibration position comprises:

transmitting, via the wireless communication interface, an indication of the sensor data and an indication of the physical arrangement of the plurality of external sensors for receipt by a computing system of the vehicle.

13. The system of claim 11, wherein causing the vehicle to navigate from the current position to the first calibration position comprises:

generating, based on the sensor data, navigation instructions for navigating the vehicle from the current position to the first calibration position; and transmitting, via the wireless communication interface, an indication of the generated navigation instructions for receipt by a computing system of the vehicle.

14. The system of claim 11, wherein the plurality of external sensors include at least one LIDAR.

15. The system of claim 11, wherein the plurality of external sensors include at least one camera.

16. A method comprising:

receiving, by a vehicle, sensor data transmitted by an external computing system, wherein the sensor data is collected using a plurality of external sensors that are physically arranged at different respective locations in a vehicle calibration facility, and wherein the sensor data is indicative of a relative position of the vehicle in the vehicle calibration facility;

operating, based on at least the received sensor data, in an autonomous driving mode to navigate the vehicle from a current position of the vehicle to a first calibration position in the vehicle calibration facility;

in response to the vehicle navigating to the first calibration position based on the received sensor data collected using the plurality of external sensors, obtaining, from a first sensor mounted to the vehicle, a first calibration measurement while the vehicle is at the first calibration position; and calibrating the first sensor based on at least the first calibration measurement.

17. The method of claim 16, further comprising:

operating, based on at least the received indication of the sensor data, the vehicle in the autonomous driving mode to navigate from the first calibration position to a second calibration position in the vehicle calibration facility;

obtaining, from a second sensor of the vehicle, a second calibration measurement while the vehicle is positioned at the second calibration position; and calibrating the second sensor based on at least the second calibration measurement.

18. The method of claim 16, further comprising:

selecting the first sensor for calibration, wherein operating the vehicle to navigate from the current position to the first calibration position is further based on selecting the first sensor for calibration.

19. The method of claim 18, further comprising:

determining, based on at least previously collected calibration data, a likelihood of measurement errors by the first sensor of the vehicle, wherein selecting the first sensor is based on the determination of the likelihood.

20. The method of claim 19, wherein the previously collected calibration data comprises previously collected calibration measurements performed using the first sensor of the vehicle, and wherein determining the likelihood is further based on collection times of the previously collected calibration measurements.

* * * * *